(12) United States Patent
Mosby et al.

(10) Patent No.: US 11,230,773 B2
(45) Date of Patent: Jan. 25, 2022

(54) MOLTEN CARBOXYLATE ELECTROLYTES FOR ELECTROCHEMICAL DECARBOXYLATION PROCESSES

(71) Applicant: ENLIGHTEN INNOVATIONS INC., Calgary (CA)

(72) Inventors: James Mosby, Salt Lake City, UT (US); Sai Bhavaraju, West Jordan, UT (US)

(73) Assignee: ENLIGHTEN INNOVATIONS INC., Calgary (CA)

( * ) Notice: Subject to any disclaimer, the term of this patent is extended or adjusted under 35 U.S.C. 154(b) by 108 days.

(21) Appl. No.: 16/244,284

(22) Filed: Jan. 10, 2019

(65) Prior Publication Data

US 2019/0218672 A1 Jul. 18, 2019

Related U.S. Application Data

(63) Continuation of application No. 14/495,642, filed on Sep. 24, 2014, now abandoned.

(60) Provisional application No. 61/881,821, filed on Sep. 24, 2013.

(51) Int. Cl.
| | |
|---|---|
| *C25B 3/00* | (2021.01) |
| *C25B 3/23* | (2021.01) |
| *C25B 3/29* | (2021.01) |
| *C25B 9/17* | (2021.01) |
| *C25B 9/19* | (2021.01) |

(52) U.S. Cl.
CPC ............. *C25B 3/00* (2013.01); *C25B 3/23* (2021.01); *C25B 3/29* (2021.01); *C25B 9/17* (2021.01); *C25B 9/19* (2021.01)

(58) Field of Classification Search
None
See application file for complete search history.

(56) References Cited

U.S. PATENT DOCUMENTS

| | | | |
|---|---|---|---|
| 3,808,051 A * | 4/1974 | Schoenholz ............ | C11D 7/261 134/2 |
| 4,560,775 A | 12/1985 | Coleman et al. | |
| 4,617,098 A | 10/1986 | Verdier et al. | |
| 5,423,454 A * | 6/1995 | Lippman ............... | B65D 83/625 204/271 |
| 6,238,543 B1 * | 5/2001 | Law, Jr. .................... | C25B 3/10 205/415 |
| 6,355,834 B1 | 3/2002 | Brownscombe et al. | |
| 2005/0056547 A1 | 3/2005 | Lin et al. | |
| 2006/0102489 A1 | 5/2006 | Kelly | |
| 2009/0194426 A1 | 8/2009 | Abbott | |
| 2010/0307927 A1 * | 12/2010 | Price ........................ | C25B 3/00 205/462 |
| 2011/0024288 A1 | 2/2011 | Bhavaraju et al. | |
| 2011/0027848 A1 | 2/2011 | Karanjikar et al. | |
| 2011/0111475 A1 | 5/2011 | Kuhry et al. | |
| 2011/0226633 A1 | 9/2011 | Bhavaraju et al. | |
| 2011/0240484 A1 | 10/2011 | Pendleton et al. | |
| 2011/0272291 A1 | 11/2011 | Stapley et al. | |
| 2012/0123168 A1 * | 5/2012 | Bhavaraju ............. | C07C 51/412 568/395 |
| 2013/0183546 A1 | 7/2013 | Joshi et al. | |
| 2013/0186770 A1 | 7/2013 | Mosby et al. | |
| 2013/0245347 A1 | 9/2013 | Mosby et al. | |
| 2014/0323784 A1 * | 10/2014 | Joshi ........................ | C25B 3/10 585/326 |

FOREIGN PATENT DOCUMENTS

| | | |
|---|---|---|
| JP | 2003-508367 A | 3/2003 |
| JP | 2003-193279 A | 7/2003 |
| JP | 2007-517979 A | 7/2007 |
| JP | 2010-513710 A | 4/2010 |
| JP | 2013-528703 A | 7/2013 |
| WO | WO-01/16075 A1 | 3/2001 |
| WO | WO-01/16077 A1 | 3/2001 |
| WO | WO-2007/027669 A1 | 3/2007 |
| WO | WO-2011/133906 A2 | 10/2011 |
| WO | WO-2015/048167 A1 | 4/2015 |

OTHER PUBLICATIONS

Weiper-Idelmann et al, Electrochemical Synthesis 65: Anodic Homocoupling of Carboylic Acids Derived from Fatty Acids, Acta Chemica Scandinavica, vol. 52, 1998 (no month), pp. 672-682 (Year: 1998).*
Stanescu et al, A theoretical study of solvent effects on Kolbe-Schmitt reaction kinetics, Chemical Engineering Science, vol. 61, No. 18, Sep. 2006, pp. 6199-6212 (Year: 2006).*
Yan et al, A model for the Kolbe reaction of acetate in a parallel-plate reactor, Journal of Applied Electrochemistry, vol. 26, No. 2, Feb. 1996 pp. 175-185 (Year: 1996).*
Schafer, Hans-Jurgen, Recent Contributions of Kolbe Electrolysis to Organic Synthesis, Topics in Current Chemistry, vol. 152, 1990 (no month), vol. 152, pp. 92-151 (Year: 1990).*
Rhodes et al., Electrolysis Reactions in Inorganic Acetate Melts, ECS Proceedings Volumes, vol. 1984-2, Proceedings of the 4th International Symposium on Molten Salts, Jan. 1984, pp. 676-693 (Year: 1984).*
Dallenbach et al, The electrochemical behaviour of a molten CF3COOK—CF3COONa eutectic, Journal of Applied Electrochemistry, vol. 9, Sep. 1979, pp. 643-645 (Year: 1979).*

(Continued)

*Primary Examiner* — Harry D Wilkins, III
(74) *Attorney, Agent, or Firm* — Foley & Lardner LLP

(57) ABSTRACT

Molten salt electrolytes are described for use in electrochemical synthesis of hydrocarbons from carboxylic acids. The molten salt electrolyte can be used to synthesize a wide variety of hydrocarbons with and without functional groups that have a broad range of applications. The molten salt can be used to synthesize saturated hydrocarbons, diols, alkylated aromatic compounds, as well as other types of hydrocarbons. The molten salt electrolyte increases the selectivity, yield, the energy efficiency and Coulombic efficiency of the electrochemical conversion of carboxylic acids to hydrocarbons while reducing the cell potential required to perform the oxidation.

22 Claims, 3 Drawing Sheets

(56) References Cited

OTHER PUBLICATIONS

Extended European Search Report in EP14849378 dated Feb. 9, 2017 (8 pages).
Final Office Action in U.S. Appl. No. 14/495,642 dated Dec. 4, 2017.
International Search Report and Written Opinion in PCT/US2014/057273 dated Jan. 14, 2015 (11 pages).
Notice of Allowance in U.S. Appl. No. 14/495,642 dated Oct. 11, 2018.
Notice of Reason for Rejection in JP2016-544359 dated Jul. 31, 2018, with English translation (7 pages).
U.S. Office Action in U.S. Appl. No. 14/495,642 dated Jul. 14, 2017.
Conway, et al., "New Approaches to the Study of Electrochemical Decarboxylation and the Kolbe Reaction: Part II. The Model Reaction with Trifluoroacetate and Comparisons with Aqueous Solution Behavior," Canadian Journal of Chemistry, vol. 41, No. 1, pp. 38-54 (1963).
Preliminary Office Action in BR Appl. Ser. No. 1120160063848 dated Nov. 21, 2019.

\* cited by examiner

MOLTEN CARBOXYLATE ELECTROLYTES FOR ELECTROCHEMICAL DECARBOXYLATION PROCESSES

RELATED APPLICATIONS

The present application claims the benefit of the filing date under 35 U.S.C. § 119(e) of Provisional U.S. Patent Application No. 61/881,821, filed Sep. 24, 2013, which is hereby incorporated by reference.

FEDERALLY SPONSORED RESEARCH OR DEVELOPMENT

Funding for the work described herein was at least in part provided by the federal government (grant 2012-10008-20263) awarded by the National Institute of Food & Agriculture/USDA. The government may have certain rights in the invention.

BACKGROUND

Conventionally, electrochemical decarboxylation is performed in polar organic solvents. These polar organic solvents have limitations on their concurrent use as electrolytes, such as limited solubility for carboxylic acids, limited conductivity, and low oxidation potential. The low oxidation potential causes the electrolyte to be oxidized congruently with the carboxylic acid generating additional activated species at the anode surface which increases the number of undesirable or inefficient side products. These limitations inhibit the commercial application of electrochemical decarboxylation processes because of inadequate current efficiency and low product selectivity. This is especially true for electrolytes based on methanol which is one of the most commonly used electrolytes for electrochemical decarboxylation. In such cases, the formation of methyl esters during electrochemical decarboxylation processes (EDP) dramatically reduces the selectivity and yield. Also, the use of polar, organic solvents reduces the environmental benefits of the process because of the high vapor pressure and toxicity common to systems using such solvents.

It would be advantageous to find an electrolyte system that has high conductivity, is electrochemically stable, and minimizes the side reactions involving the electrolyte.

BRIEF SUMMARY

In one aspect, an electrochemical cell is disclosed, having an electrolyte compartment with a quantity of electrolyte, the electrolyte comprising a quantity of an inorganic salt of a carboxylic acid dissolved in a molten salt electrolyte; an anode in communication with the electrolyte; a cathode in communication with the electrolyte; and a voltage source that decarboxylates the metal salt of the carboxylic acid into radicals that react to form at least one radical coupling product.

In another aspect, an electrochemical cell is disclosed, having an anolyte compartment housing an anolyte comprising a inorganic salt of a carboxylic acid dissolved in a molten salt electrolyte; an anode in communication with the anolyte; a catholyte compartment capable of housing a quantity of catholyte; a cathode in communication with the catholyte; a membrane separating the anolyte and catholyte compartments; and a voltage source.

In some embodiments, the cation of the electrolyte inorganic salt is selected from an alkaline metal, an alkaline earth metal and mixtures of the same. In some embodiments, the cation of the electrolyte inorganic salt is selected from lithium, sodium, potassium, magnesium, calcium, and mixtures of the same. In some embodiments, the electrolyte contains a mixture of inorganic cations. In some embodiments, the electrolyte contains a mixture of at least three inorganic cations. In some embodiments, the oxidation potential of an anion in the molten electrolyte is higher than the oxidation potential of the carboxylate anion. In some embodiments, a carboxylate portion of the inorganic carboxylate salt is selected from: acetate, propionate, lactate, butyrate, pentanoate, hexanoate, heptanoate, octanoate, laurate, oleate, stearate, linoleate, palmitate, myristrate, levulinate, valerate, benzoate, naphthenate and naphthoate.

In some embodiments, the electrolyte is a eutectic mixture with a lower melting point than the melting point of the individual components of the electrolyte mixture. In some embodiments, the cell is operated at a temperature above the melting point of the molten salt electrolyte, but below the melting point of the products of the reduction and oxidation reactions.

In another aspect, a method for producing a coupled radical product is disclosed, having the steps of providing a inorganic salt of a carboxylic acid; contacting the salt of a carboxylic acid with a molten salt electrolyte applying a voltage to the electrolyte and carboxylate salt.

In some embodiments, the electrolyte is a eutectic mixture with a lower melting point than the melting point of the individual components of the electrolyte mixture.

DETAILED DESCRIPTION OF THE DRAWINGS AND THE PRESENTLY PREFERRED EMBODIMENTS

Figure 1:
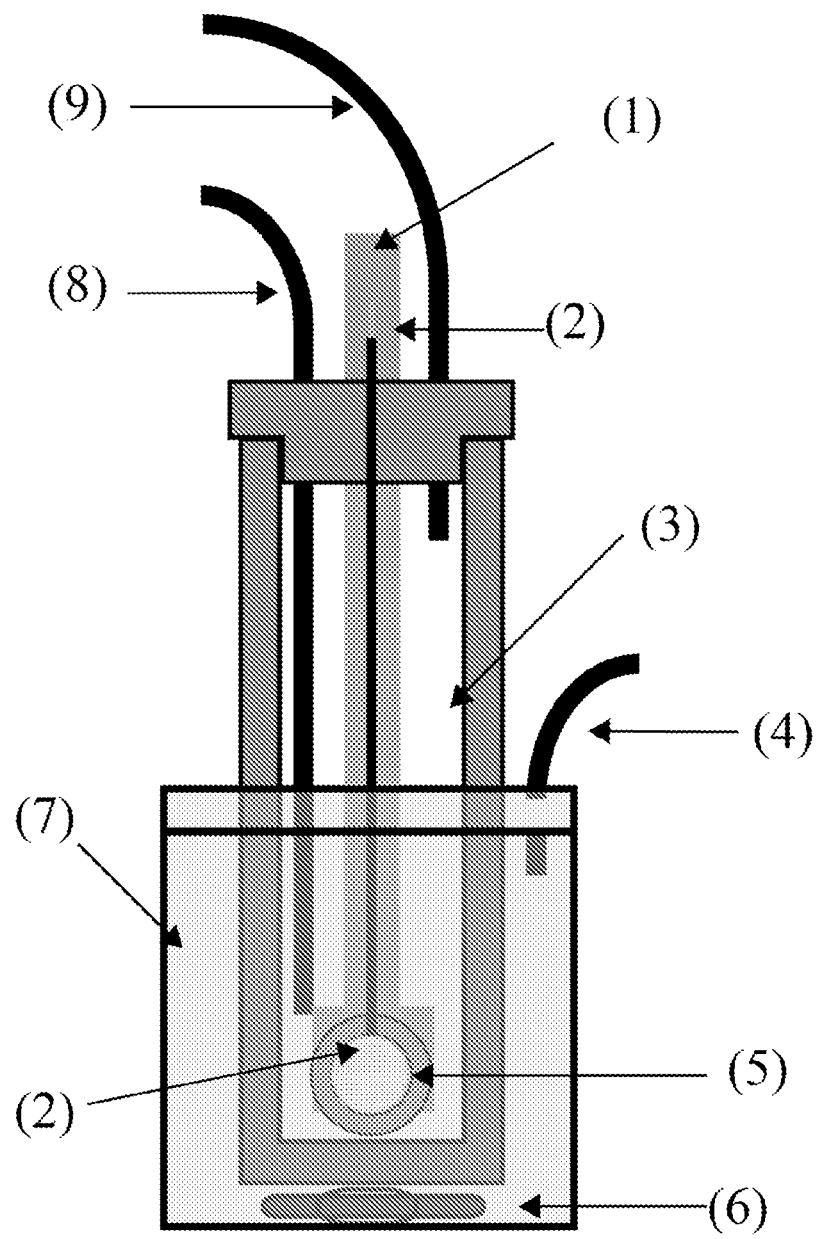
FIG. 1 shows a schematic drawing of an electrochemical cell that may be used for carrying out electrochemical decarboxylation process using molten salt electrolytes in some embodiments.

The present disclosure describes the use of molten salts as electrolytes for electrochemical decarboxylation processes (EDP). The EDP can be used to convert a variety of carboxylic acids into different hydrocarbon products. Carboxylic acids ($RCO_2H$) make up a board class of organic compounds, where R can be an alkyl group, cycloalkyl group, an alkyenyl, and alkynyl group and an aryl group. The R group can also contain a hydrocarbon that may possess heteroatoms such as O, S, N, etc. The electrolyte disclosed herein can be used for electrochemical decarboxylation which removes $CO_2$ from the carboxylic acid and creates a high energy radical or a carbocation to form carbon-carbon, carbon-hydrogen, or carbon-oxygen bonds with other species present in solution. This process can be used to synthesize a variety of different types of organic compounds such as saturated hydrocarbons, diols, esters, olefins, aryl-alkyl compounds, etc. The electrochemical decarboxylation process is advantageous to other methods conventionally used to synthesize these compounds because the chemicals involved in the process are environmentally friendly, and the process does not require the use of catalyst.

The reactive carboxylic acid may be of formulas $R^1COOM$ and $R^2COOM$. The resulting products obtained by practicing the electrolytic decarboxylation disclosed process are compounds of formula $R^1$—$R^2$. Each of $R^1$ and $R^2$ is independently selected from unsubstituted and substituted alkyl, unsubstituted and substituted cycloalkyl, unsubstituted and substituted heterocyclyl, substituted and unsubstituted alkenyl, substituted and unsubstituted alkynyl, substituted and unsubstituted aryl, and substituted and unsubstituted heteroaryl. Each M is independently an inorganic cation selected from alkaline and alkaline earth metals and ammonium.

Substitutions on substituted alkyl, cycloalkyl, heterocyclyl, alkenyl, alkynyl, aryl, and heteroaryl include: halogen, unsubstituted $C_{1-8}$ alkyl, —CN, —$NO_2$, =O, —C(O)$R^A$, —$CO_2R^A$, —C(O)$NR^AR^B$, —$OR^A$, —OC(O)$R^A$, —OC(O)$NR^AR^B$, —$NR^CC(O)R^A$, —$NR^CC(O)NR^AR^B$, —$NR^AR^B$, —$NR^CCO_2R^A$, —$NR^CS(O)_2R^A$, —$SR^A$, —S(O)$R^A$, —S(O)$_2R^A$, —S(O)$_2NR^AR^B$; wherein each of $R^A$, $R^B$, and $R^C$, when present, is independently selected from the group consisting of: —H, unsubstituted $C_{1-8}$ alkyl, unsubstituted $C_{2-8}$ alkenyl, or unsubstituted $C_{2-8}$ alkynyl.

In some embodiments, the substitutions on substituted alkyl, cycloalkyl, heterocyclyl, alkenyl, alkynyl, aryl, and heteroaryl are located geminal to the group —COOM.

It is an aim of the present disclosure to describe the preparation and use of molten salts as electrolytes for electrochemical decarboxylation. Such molten salt electrolytes provide high conductivity, high solubility and reaction compatibility all of which promote high yield and efficiency. Other properties of molten salts which are added benefits to their use as electrolytes are low surface tension, viscosity, and vapor pressure. Molten salts are fluid above their melting point, or sometimes when used as mixtures are fluid below their individual melting point due to the formation of an eutectic system or mixture.

Development of molten salt electrolytes has been conducted for applications in high temperature batteries, electrowinning, electrorefining, electrolysis, and electroplating. In most cases, the molten salt electrolytes are made with a salt or a mixture of salts with a single elemental cation and anion, for example the electroplating of magnesium is performed using an electrolyte comprising of the mixture NaCl—$CaCl_2$—KCl—$MgCl_2$. In comparison, the molten salt electrolytes of the present disclosure include salts with polyatomic ions or a mixture of salts including polyatomic ions. One class of polyatomic ion based molten salts that have been used for electrolytes for different electrochemical process are ionic liquids. Ionic liquids are comprised of a single bulky polyatomic cation and anion pair which melts around or below 100° C., whereas the molten salt electrolytes disclosed in the present disclosure are not limited to polyatomic ions, or to a single cation and anion pair, or to temperatures below 100° C. One example of using molten salts containing atomic and polyatomic ions is the use of sodium carboxylates from fatty acids as a molten solvent for the Henkel disproportionation reaction disclosed in PCT/US2000/021648. Unlike this in the present disclosure, the molten salts are chosen specifically for the use as electrolytes in an electrolytic cell to perform electrochemical decarboxylation. Such an electrolyte system improves the electrochemical decarboxylation process by providing the inherent benefits of molten salt electrolytes, while the use of complex polyatomic ions increases the amount of active species present in the electrolyte and at the electrode surface increasing the selectivity and hence yield of the process.

The present disclosure includes novel electrolyte systems designed for the electrochemical decarboxylation process and include at least one cation and anion pair making up a molten salt. The cation and anion of the molten salt are chosen such that the carboxylic acid being decarboxylated has a high solubility, the oxidation of the anion does not increase the amount of side products, and the product of the decarboxylation is easily separated from the molten salt. The molten salt electrolyte is also tuned for high electrochemical stability in the required potential range, and low chemical reactivity to species generated by the decarboxylation process. Such a molten salt electrolyte increases the selectivity of the decarboxylation process by reducing the number of reactions which can occur in proximity to the anode, which increases the yield and the Coulombic efficiency. Also, being able to operate at high temperatures reduces the activation energy required to cause the oxidation of the carboxylate to the radical, in-turn lowering the operating potential of the cell and reducing the electrical energy required for the conversion. The ability to combine different cations and anions provides tunability of the electrolyte so that it can be optimized for the specific decarboxylation of interest. Also, one could combine more than one cation/anion ion pair in a molten salt electrolyte in order to change the properties of the obtained molten salt, for example the melting point of the molten salt can be depressed by combining more than one cation and anion pair.

The electrochemical decarboxylation is a technique used to generate radicals for synthetic applications and is characterized as either Kolbe electrolysis or non-Kolbe electrolysis. The term Kolbe electrolysis is used to define the decarboxylation of carboxylic acids leading to radicals that then combine forming either homocoupling or heterocoupling products, and can also add to double bonds. A generic example of decarboxylation leading to homocoupling is shown below.

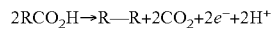

$$2RCO_2H \rightarrow R-R + 2CO_2 + 2e^- + 2H^+$$

The term, non-Kolbe electrolysis is used to define the decarboxylation of carboxylic acids that lead to the formation of carbocations from a two electron oxidation. The carbon cation can then participate in a number of electrophilic reactions such as heck-type reactions, substitution and addition reactions, and heteroatom bond formation. Olefins are one of the possible products that can be obtained from a two electron oxidation of a carboxylic acid. A generic example of decarboxylation leading to an electrophilic substitution reaction is shown below.

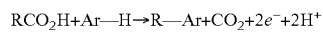

$$RCO_2H + Ar-H \rightarrow R-Ar + CO_2 + 2e^- + 2H^+$$

In one embodiment, the decarboxylation is performed on salts of carboxylic acids. The saponification of carboxylic acids follows the generally accepted procedure of reacting the carboxylic acid with a base (BOH) at an elevated temperature. Some non-limiting examples of bases are lithium hydroxide, sodium hydroxide, potassium hydroxide, ammonium hydroxide and phosphonium hydroxide. A generic neutralization reaction is written below.

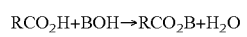

$$RCO_2H + BOH \rightarrow RCO_2B + H_2O$$

The decarboxylation of the carboxylate salts follow the same general reaction schemes as was shown for the carboxylic acids, except instead of a proton being generated another cation $B^+$ is generated which can then be involved in reduction reactions at the cathode. In one embodiment, the decarboxylation of the salts is performed using a two compartment electrochemical cell, which is afforded via an ion exchange or an ion selective membrane, and the cation or proton produced at the anode can be shuttled from the anolyte to the catholyte.

Carboxylic acids are becoming a popular substrate to perform the synthesis of industrially important compounds as they are economically and environmentally friendly. One application for which they may be considered, is as alternatives to organohalides in the Heck reaction for the formation of carbon-carbon double bonds. Replacing the organohalides with carboxylic acids is more environmentally friendly, because $CO_2$ and $H_2$ are the only by-products formed instead of the halide by-products produced using the other routes. They may also be considered as substrates for cross-coupling reactions where the carboxylic acid can act as either the nucleophilic or electrophilic coupling partner. This is advantageous as there are a large number of carboxylic acids available commercially, which are more economical than the conventionally used organohalides and/or organometallic reagents.

While the systems described above benefit from the availability and low cost of carboxylic acids, they still require catalyst and high temperatures to promote the transformations. The electrolysis method performed using the molten salt electrolyte disclosed in the present application does not require the use of catalyst and can be perform under mild reaction conditions. And while the Kolbe electrolysis is well known, the method would be greatly improved by the use of an electrolyte system that increases the solubility of the carboxylic acid, provides high conductivity and stability, facilitates in product isolation, increases the yield obtained from the process, lowers the required electrical energy, and is economically viable as a large scale industrial electrolyte.

Some terms and their definitions that will be used throughout the description are defined as follows. The term "molten salt" means a liquid that is made up of different cation and anion pairs. The term "eutectic" means a mixture of chemicals or elements with a composition which solidifies at a lower temperature than any other composition of the mixture. The term "hydrocarbon" means a compound consisting of carbon and hydrogen and can refer to saturated or unsaturated compounds. The term "efficiency" and "current efficiency" are used interchangeably and refer to the Coulombic efficiency of the electrochemical decarboxylation process. The term "conversion" means the amount of reactant that is consumed in the electrochemical decarboxylation process. The term "selectivity" is used to describe the amount of the consumed reactant that is converted into the product of interest, and the term "yield" means the amount of the original reactant that is converted into the product of interest. The term "carboxylic acid" is a compound with the general formula $RCO_2H$, where the "R" can represent saturated or unsaturated hydrocarbon chains. The term "decarboxylation," herein refers to the process of removing $CO_2$ from a compound, specifically from a carboxylic acid or anion. The terms "substituent" and "functional group" are used interchangeably and herein refer to an atom or group of atoms that has substituted a hydrogen atom on a carbon chain of a hydrocarbon.

The present disclosure is generally directed to a method using molten salts as electrolytes in electrochemical decarboxylation processes (EDP). The molten salt electrolyte will be chosen based on the specific type of carboxylic acid precursor being decarboxylated in the electrolytic cell, and the hydrocarbon product that is produced. The ability to use different molten salts for different reactions provides a means to increase the reaction yield and improve the product isolation for a variety of different systems. Some of the properties that will affect the choice of the molten salt are melting point, hydrophilicity/lipophilicity, electrochemical stability, and miscibility. An example of changing the molten salt cation for different synthesis requirements is the need to use an $X^+$ cation based salt instead of a $Y^+$, or a mixture of salts with $X^+$ and $Y^+$ cations in order to decrease the melting point of the molten salt electrolyte, and/or to use a two compartment cell with the compartments separated by a ion selective membrane. The choice of anion is known to affect the solubility, miscibility and oxidative stability of the molten salt. For example an $A^-$ anion could be used where the $A^-$ is a carboxylate anion and is directly used in the decarboxylation process, or a mixture of $A^-$ and $C^-$ anions could be used where $C^-$ is an inactive anion at the electrode and increases the conductivity of the molten salt.

In one embodiment, the cation of the molten salt electrolyte is an inorganic cation. In some embodiments, the inorganic cation is an alkaline metal. In some embodiments, the inorganic cation is an alkaline earth metal. In some embodiments, the inorganic cation is selected from alkaline and alkaline earth metals. In some embodiments, the inorganic cation is ammonium. In some embodiments, the inorganic cation is selected from alkaline and alkaline earth metals and ammonium. In some embodiments, the inorganic cation is selected from alkaline metals and ammonium. In some embodiments, the inorganic cation is selected from alkaline earth metals and ammonium. In one embodiment, the cation of the molten salt electrolyte is based on or more of the following cations listed as non-liming examples: ammonium, sodium, lithium, potassium, magnesium, and calcium. In some embodiments, the cation is selected from one or more of the cations: imidazolium, pyridinium, pyrrolidinium and phosphonium. Each of these cations can be used as the sole cation of the molten salt or used as one component of a mixture of cations in the molten salt. The cation of the molten salt electrolyte should be chosen so it is either inactive in the electrochemical window that the cell is operated in, is transported through an ion exchange or ion selective membrane or it should be chosen to have a low reduction potential. The later choice would be for cases where the cation is reduced at the cathode at a low reduction potential, while the electrolysis of interest occurs at the anode. The low potential reduction at the cathode will help reduce the overall cell potential and thus lower the energy demand and improves the economics of the electrolysis.

In one embodiment, the cation of the molten salt is a polyatomic ion. The use of polyatomic cations can drastically lower the melting points of the molten salt when compared to the corresponding alkali or alkaline metal cations. For example lithium chloride melts at 605° C., sodium chloride melts at 801° C., potassium chloride melts as 770° C., ammonium chloride melts at 340° C. and tetrabutylammonium chloride melts at 105° C. In some cases the melting point of the molten salt with a polyatomic cation can be low enough, less than 100° C., to be included in a special class of molten salts termed ionic liquids. In one embodiment, the reduction of the polyatomic cation at the cathode provides a low potential reduction couple for the oxidation occurring at the anode. In another embodiment, a two compartment cell is used and another species provides a low potential reduction reaction. In one embodiment, the cation of the molten salt is an alkali or alkaline metal cation.

The use of an alkali or alkaline metal cation provides a highly conductive and stable electrolyte. The small size and relativity high charge density on the alkali and alkaline cations relative to the polyatomic cations increases the conductivity of molten salts with small cations. Molten salts comprising of alkali and alkaline cations can be used in single or two compartment cells as inert charge carriers or as the active species involved with the electron transfer at the cathode.

In another embodiment, the molten salt electrolyte is comprised of a mixture of cations. A mixture of salts that have different cations but the same anion can have a melting point that is suppressed compared to the melting points of the individual salts of the mixture. The ability to decrease the melting point by adding different cations without adding different anions to the molten salt is important because the additional cations are not involved in the reactions at the anode surface and thus do not contribute to the formation of side products produced during the oxidation. The different cations making up a molten salt electrolyte can be atomic or polyatomic and can have the same or different amount of charge.

The anion of the molten salt may be selected from the groups of halides, sulphonates, amides, tosylates, aluminates, borates, sulfates, nitrates, and carboxylates. To those familiar with the art it is obvious that the anions of the molten salt should be electrochemical inactive and chemically inert to reactions that could occur at the surface at the anode; or the anions should consist of anions that are involved in the decarboxylation process. In one embodiment, the molten salt is comprised of a mixture of anions. The different anions in the molten salt can have the same or different charge number, and can increase conductivity and decrease the melting point of the molten salt. For example sodium fluoride melts at 993° C., sodium chloride melts at 801° C., sodium bromide melts at 747° C., sodium iodide melts at 661° C., sodium nitrate melts at 308° C., sodium propionate melts at 289° C. and sodium lactate melts at 150° C.

In another embodiment, the anions of the molten salt will be chosen so that they are similar to the carboxylate being processed in the electrolytic cell. The similarity of the anion of the molten salt electrolyte and the carboxylate being decarboxylated increases the solubility of the later. In such an embodiment, one of the differences between the carboxylate used in the molten salt and the carboxylate being processed will be that the oxidation potential of the former is larger, thus promoting the oxidation of the later forming the desired hydrocarbon. In another embodiment, the anion of the molten salt will be the same as the carboxylate that is being processed in the electrolytic cell. In this embodiment, any oxidation of the molten salt electrolyte will form the same product as the oxidation of the carboxylate being processed in the cell. It should be clear to one experienced in the field that the anion of the molten salt electrolyte should be chosen to primary reduce the side reactions at the anode, and then other properties that the anion affects can be taken into consideration.

In one embodiment, the molten salt electrolyte is comprised of a mixture of salts that have different cations but the same anion. In another embodiment, the molten salt electrolyte is comprised of a mixture of salts that have the same cation and different anions. In another embodiment, the molten salt electrolyte is comprised of a mixture of salts with different cations and different anions. The composition of the molten salt mixture will be determined by: 1) the melting point of the melt and the desired operating temperature, 2) the conductivity of the molten salt, 3) reactions that occur at the anode, and 4) reactions occurring at the cathode or membrane interface. In all cases the molten salt electrolyte will be comprised of at least one salt for which the anion is comprised of the carboxylate being converted by the decarboxylation process. It should be clarified that the carboxylic acid or salt of the carboxylic acid being decarboxylated can be added to a molten salt electrolyte to a small or large extent anywhere from 1-100% by weight.

In one embodiment, the molten salt is made up of a binary mixture, in other cases it is made up of a ternary mixture, still yet in other cases it is made up of a quaternary mixture. The molten salt can be comprised of a mixture with any number of salts required to obtain the properties required.

In one embodiment, the molten salt electrolyte is prepared by heating a pure salt until it melts. In another embodiment, multiple salts are mechanically mixed together and then the mixture is heated up to afford the molten salt. In another embodiment, one salt or a mixture of salts is heated and additional salts are added to the melt. In some embodiments the salt mixture is heated and cooled several times before being used as an electrolyte. This promotes intimate mixing of the different salts present in the mixture helping to disrupt any short range order and thus suppresses the melting point. In some embodiments, the composition of the molten salt is optimized in order to decrease the temperature which the mixture freezes. The composition of the mixture is optimized by varying the concentration of the different salt components, while monitoring the physical properties of the mixture. The composition of the molten salt electrolyte can contain at low as 2% of any particular salt and up to 98% of any other particular salt. The optimized composition of the molten salt electrolyte could be one that causes a eutectic to form.

In one embodiment, the majority of the molten salt is a carboxylate salt. In another embodiment, the majority of the molten salt is a salt other than a carboxylate salt. The carboxylate salt or carboxylic acid that is of interest to the decarboxylation process can make up a small or large portion of the molten salt composition, and can be added to the molten salt as the electrolysis progresses. Some non-limiting examples of carboxylate anions that could be used as components in the molten salt electrolytes are acetate, propionate, lactate, butyrate, pentanoate, hexanoate, heptanoate, octanoate, laurate, oleate, stearate, linoleate, palmitate, myristrate, levulinate, valerate, benzoate, naphthenate and naphthoate.

In one embodiment, the molten salt electrolyte is used in a one compartment cell and a carboxylic acid or a salt of a carboxylic acid is dissolved into the molten salt electrolyte. In this embodiment, the molten salt electrolyte needs to be designed to limit the number of side reactions at the anode, have a high conductivity, and provide a low potential reduction reaction at the cathode. The first requirement is in order to increase the current efficiency and product selectivity and depends on the anions present in the molten salt electrolyte. The second requirement is required to decrease the operating potential of the cell and depends on both the cation and anions in the mixture. The third requirement is also desired to lower the cell's operating potential and is dependent on the cations in the mixture. In such a configuration, it will be clear to those skilled in the art that the products of the reduction and oxidation reaction should be easily separated from the molten salt upon formation and easily separated from each other. As a non-limiting example, the products formed are gases at the operating temperature of the cell and thus are easily separated from the molten salt electrolyte, for example through the application of a slight vacuum.

Figure 2:
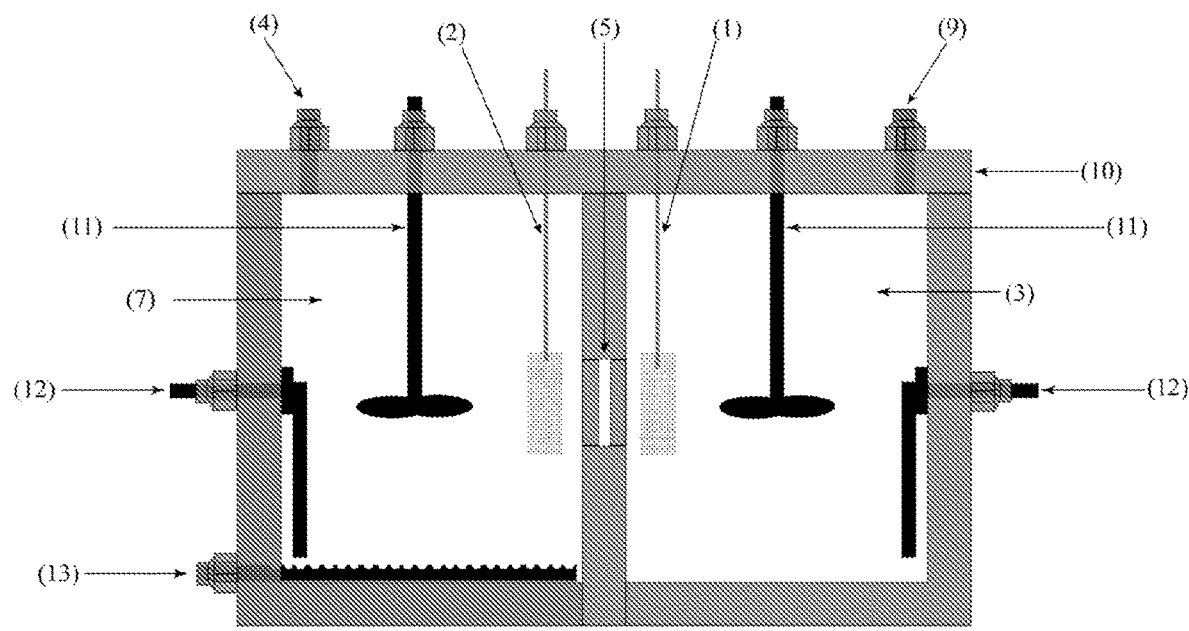
FIG. 2 shows a schematic drawing of an electrochemical cell that may also be used for carrying out the electrochemical decarboxylation process using molten salt electrolytes in some embodiments.

In another embodiment, a two compartment electrolytic cell schematically represented in FIG. 1 or FIG. 2 is used, which have two compartments separated by an ion exchange (5) or an ion selective membrane, for example a NaSelect® membrane. In such an embodiment, the anolyte and the catholyte can both be comprised of a molten salt electrolyte, each designed specifically for the reactions that occur at the two different electrodes, or each being the same electrolyte with different and/or the same species dissolved in them. In another embodiment, the anolyte can be comprised of a molten salt electrolyte, and the catholyte can be comprised of an electrolyte that is not a molten salt. It should be clear to those skilled in the art, that in this case the catholyte can be designed to produce a second chemical or chemicals of value while the conversion of the carboxylate to a hydrocarbon is occurring at the anode.

The anolyte is fed into the anode chamber (7), and during electrolysis is oxidized at the anode's (2) surface causing the decarboxylation of the carboxyl functional group forming a radical and $CO_2$. On the other side of the cell, the reduction of the catholyte is occurring and to maintain charge balance a positive ion must transfer from the anode to the cathode, and in the case when the anolyte and catholyte are separated there needs to be a path for the positive ions to transfer between compartments. In one embodiment, an ion conducting membrane (5) selectively transfers alkali ions (M+), including but not limited to the ions of, sodium, lithium, and potassium, from the anolyte to the catholyte under the influence of an applied electrical field. In another embodiment, an ion exchange membrane (5) shuttles the cations from the anolyte to the catholyte. In another embodiment, an anion exchange membrane (5) can be used to shuttle anions from the catholyte to the anolyte which are then decarboxylated at the anode. In one embodiment, a three compartment cell can be used which uses more than one type of membrane.

In one embodiment, the membrane (5) is between 10 and 5000 microns thick, or more preferable the membrane is between 100 and 1000 microns thick, or even more preferable the membrane is between 200 and 700 microns thick. In one embodiment, the membrane is in the form of disk with diameters between 0.25-25 cm, even more preferably the diameter is between 1.27-12.7 cm, or most preferably between 2.54-7.62 cm and are assembled in a scaffold. In another embodiment, the membrane is in the form of a cylinder with a diameter between 0.25-25 cm, even more preferably between 1.27-12.7 cm, or most preferably between 2.54-7.62 cm.

In one embodiment, the electrochemical cell can be in a parallel plate configuration which uses flat membranes, for example as shown in FIG. 1 and FIG. 2. In another embodiment, the electrochemical cell is in a tubular configuration which uses tubular electrodes and membranes. It should be clear to one skilled in the art that the cell configurations listed above both have advantages and disadvantages which would lead to one being chosen over the other depending on the requirements of the specific carboxylic salt being decarboxylated. It should also be clear to one skilled in the art that the process described herein can be applied in a variety of cell designs.

The anode (2) can comprise any suitable material that allows oxidation reactions to occur in the anolyte compartment (7) when an electrical field is applied between the anode (2) and cathode (1). Some non-limiting examples of anode materials include, but are not limited to, platinum, titanium, nickel, cobalt, iron, stainless steel, lead dioxide, metal alloys, combination thereof, and other known or novel anode materials. In one embodiment, the anode (2) may comprise of iron-nickel alloys such as KOVAR® or INVAR®. In other embodiments, the anode may comprise carbon based electrodes such as boron doped diamond, glassy carbon, and synthetic carbon. Additionally in some embodiments, the anode comprises a dimensionally stable anode (DSA), which may include, but is not limited to, rhenium dioxide and tantalum pentoxide on a titanium substrate.

The cathode (1) may also be fabricated of any suitable cathode material that allows the reduction reaction to occur without electrode corrosion. The cathode may comprise of the materials used for the anode (2) or the cathode (1) may comprise of materials different from that used as the anode. Some non-limiting examples of suitable cathode materials include without limitation, platinum, nickel, stainless steel, graphite, and any other suitable cathode material that is known or novel.

In one embodiment, the electrodes have a smooth morphology such as a foil or thin film. In another embodiment, the anode (2) and cathode (1) have a high surface area morphology, for example but not limited to, a foam, grit, or other porous structure. In one embodiment, the anode (2) and cathode (1) have the same morphology. In another embodiment, the electrodes have a different morphology. In one embodiment, the electrodes are attached to the membrane in the cell.

In one embodiment, the electrolyte is fed into the cell without a membrane. The electrolyte comprises of a molten salt electrolyte and a carboxylic acid or a salt of a carboxylic acid. In another embodiment, the anolyte is fed into the anolyte compartment (7), and the catholyte is fed into the catholyte compartment (3) which are separated by a membrane (5). The anolyte consists of a molten salt electrolyte for which the composition includes at least one salt of a carboxylic acid. The carboxylate that is dissolved into the molten salt electrolyte is chosen based on the desired products of the decarboxylation reaction, and can be aliphatic or aromatic in nature. The carboxylate ion can contain various functional groups, and or heteroatoms. In one embodiment, multiple carboxylates are dissolved in the molten salt electrolyte and decarboxylated in the electrolysis cell simultaneously, thus leading to homo and hetero coupling.

The anolyte solution may comprise of a mixture of the molten salt electrolyte and a polar solvent. For some non-limiting examples of suitable polar solvents include without limitation, water, methanol, ethanol, isopropanol, n-propanol, acetone, acetonitrile, dioxane, butanol, dimethyl sulfoxide (DMSO), carbon disulfide (CS2), diethyl carbonate, ethylene carbonate, and glycerol. In one embodiment, the anolyte solution may comprise of a mixture of a molten salt electrolyte and an aromatic solvent. Some non-limiting examples of aromatic solvents are benzene, naphthalene, xylene, nitro benzene, phenol and toluene. In some embodiments, the anolyte solution may comprise of a mixture of a molten salt electrolyte and a non-polar organic solvent. Some examples of non-polar organic solvents are hexane, cyclohexane, pentadecane, petroleum ethers, and dodecane. In such embodiments the carboxylate salts are soluble in the molten salt electrolyte, and the products of the decarboxylation are soluble in the non-polar solvent, and thus are easily separated from the reactants.

Certain alkali ion conductive membranes, for example NaSICON and LiSICON-type membranes, have a high temperature tolerance and thus the anolyte solution may be heated to a higher temperature without substantially affecting the temperature of the catholyte solution or the functionality of the membrane. In some embodiments, the anolyte is a molten salt at temperatures above 150° C., while the catholyte is a polar solvent which could boil at the temperature of the molten salt, thus requiring a membrane with a high temperature tolerance. In another embodiment, molten sodium and/or lithium metal is used as the catholyte as some NaSICON and LiSICON-type membranes are stable to molten sodium and/or lithium metal.

The anolyte solution may optionally contain a supporting electrolyte which is soluble in the molten salt and provides additional electrolyte conductivity in the molten salt. Non-limiting examples of supporting electrolytes include alkali metal hydroxide, alkali metal salts, ammonium tetrafluoroborate, tetramethylammonium hexafluorophosphate, tetrabutylammonium tetrafluoroborate, tetramethylammonium perchlorate, and tetraethylammonium perchlorate. It should be appreciable to those skilled in the art that other soluble ionic compounds may be used.

The catholyte may comprise of a solvent that is the same or different than the molten salt anolyte. This is afforded because the ion conducting membrane (5) isolates the compartments from each other. Thus, the anolyte and catholyte may be separately selected specifically for the reactions that occur in each compartment and/or the solubility of the chemicals required for the specific reactions. This permits one to design an inexpensive catholyte which may have different properties than the anolyte, for example to have high ionic conductivity and a low reduction potential.

In one embodiment, the catholyte is comprised of an unsaturated aqueous solution containing alkali salt or ammonium salts. The salt concentration is between 0.1-50% by weight, or more preferably between 5-25% by weight, or most preferably between 7-15% by weight. In another embodiment, the catholyte is an unsaturated high boiling point polar organic solvent with an alkali salt or ammonium salt. In another embodiment, the catholyte is a molten salt that is compatible with the ion that is transferring across the membrane and provides a low potential reduction reaction. In another embodiment, catholyte is a liquid metal such as sodium or lithium metal. In all the embodiments described above, one can imagine that the catholyte is chosen such that the reduction reaction produces chemical/chemicals that are economically valuable.

When an electric field is applied between the cathode (1) and anode (2), a reduction reaction occurs at the cathode (1). When the catholyte solution is an aqueous based solution, water is reduced to hydrogen gas and hydroxide ions. The hydroxide formed can then combine with the cation that is transported through the membrane (5) causing the hydroxide concentration of the catholyte to increase as the electrolysis is performed. When the catholyte is comprised of an ammonium solution the ammonium is reduced producing ammonia and hydrogen, which depending on the cell temperature will separate from the catholyte as gases. When the catholyte is a metal the alkali ion that is transported through the membrane is reduced to the metal.

When an electrical field is applied between the cathode (1) and anode (2) oxidation occurs at the anode (2). In one embodiment, the oxidation of a carboxylic acid or a carboxylate anion leads to decarboxylation, producing carbon dioxide and a radical. The radical can then combine with another radical to form homo- or hetero-coupling products, following Kolbe electrolysis or it can react with other species present at the electrode's surface following non-Kolbe electrolysis. In another embodiment, when there is an electron donating group in the alpha position to the carboxyl group, the decarboxylation leads to the formation of $CO_2$ and a carbon cation from a two electron oxidation. Following its formation, the carbon cation can then participate in nucleophilic reactions instead of coupling reactions.

In one embodiment, the anolyte is used at temperatures above the melting point of the salt or the mixture of salts making up the molten electrolyte and above the boiling point of the product formed at the anode. In another embodiment, the anolyte is used at temperatures above the melting point of the salt or the mixture of salts making up the molten electrolyte, but below the boiling point or the melting point of the product. The temperature of the anolyte will be chosen in a range according to the stability of the electrolyte and products. In one embodiment, the temperature of the anolyte is adjusted within this range to optimize the viscosity, conductivity, and product separation. The temperature of the molten salt electrolyte promotes the decarboxylation through lowering the activation energy of the oxidation, and helping drive the CO2 from the carboxylate anion and electrolyte. In such an embodiment, the potential the cell operates at is lowered because the amount of electrical energy required to cause the oxidation has decreased due to the system's thermal energy.

In one embodiment, the electrolytic cell may be operated in a continuous mode. In continuous mode, the cell is initially filled with an anolyte and catholyte and then, during operation additional reactant is fed into the cell, and products, by-products, and/or diluted solutions are removed from the cell without ceasing operation of the cell. In another embodiment, the electrolytic cell is operated in batch mode. In batch mode, the anolyte and catholyte are fed initially into the cell, and then the cell is operated until a desired concentration of the product is produced. The cell is then emptied, and the products are collected. The cell is then refilled to start the process again. Also, in either mode, the feeding of the reactant may be done using a premade solution or using components that form the electrolyte in situ.

In one embodiment, the anolyte comprises of a molten salt electrolyte, and a salt of a carboxylic acid. The choice of carboxylic acid is dependent on the desired product and can be chosen from any class of carboxylic acids. Some non-limiting examples are fatty acids, alkyl carboxylic acids, amino acids, aryl carboxylic acids, and di- and tri-carboxylic acids. The carboxylic acid can also have multiple substituents present, in addition to the carboxylic group. These additional functional groups can be located at any carbon site of the carboxylic acid, and in some embodiments are located in the alpha position to the carboxylate carbon. Both electron donating and withdrawing substituents can be present on the carboxylic acid. Some non-limiting examples of electron donating substituents are hydroxyl, amine, amide, and ether groups. Some non-limiting examples of electron withdrawing substituents are halogens, nitriles, carbonyl, nitro, and nitride groups. The functional group present in the alpha position to the carboxylate will help determine whether the decarboxylation will follow a one electron or two electron oxidation mechanism. In one embodiment, one electron oxidation will occur, favoring radical-radical coupling because there is no substituent present in the alpha position or the substituent is an electron withdrawing group. In another embodiment, the two electron oxidation is favored, because there is an electron donating group present in the alpha position to the carboxylate group.

In one embodiment, the first step is to convert the carboxylic acid ($RCO_2H$) into the corresponding alkali salt ($RCO_2B$) via acid neutralization, where B is a base such as lithium, sodium, potassium, calcium, magnesium, phosphonium, or ammonium; $RCO_2H$ is a carboxylic acid and R is a hydrocarbon having a $C_2$ to $C_{22}$ hydrocarbon chain in which one of the hydrogen atoms can be substituted for different functional groups. Some non-limiting examples of functional groups that can be present are hydroxyl, phenyl, esters, ethers, and ketones. In one embodiment, the carboxylic acid has other substituents which do not contain oxygen such as: halide, nitrile, amine, amide, and sulfide. In one embodiment, the carboxylic acid is obtained from biomass with the additional substituent already present. In another embodiment, the biomass derived carboxylic acid is first modified to include the additional functional groups.

In one embodiment, when an electrical potential is applied between the anode (2) and cathode (1), the oxidation at the anode (2) causes the decarboxylation of the carboxylate anion, leading to the formation of carbon dioxide, and radicals of (R.) according to the reaction below:

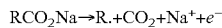
$$RCO_2Na \rightarrow R. + CO_2 + Na^+ + e^-$$

Once the radical is formed, it will react with other species at the electrode's surface, and if it reacts with another radical of the same carboxylate anion, it will form a homocoupling product as shown below:

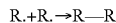
$$R. + R. \rightarrow R-R$$

This product can be in itself the chemical of interest, or it can be used as an intermediate precursor in the synthesis of the chemical of interest. For example, function groups on the carboxylic acid can be converted into double bonds and corresponding diene can be used as monomers for the production of elastic material. If the radical combines with a radical of a different carboxylate anion, then a heterocoupling product will be formed and an unsymmetrical compound will be obtained. Again the heterocoupling product can be a chemical of interest or a precursor required to obtain a chemical of interest. In one embodiment, the decarboxylation will lead to a mixture of homocoupling and heterocoupling and thus provide a mixture of products. In one embodiment this mixture is commercially viable, yet in another embodiment the mixture will be further separated into a commercially viable product.

In one embodiment, the molten salt electrolyte is designed to facilitate the separation of the products from the reactants. For example, the electrochemical cell is operated at a temperature that is above the product boiling point and the cell under slight vacuum. Thus, when the product is formed it is converted to a gas and removed from the cell simultaneously. Similarly, the molten salt electrolyte can have high solubility of the polar carboxylate reactants, and poor solubility of the products, such that when a non-polar solvent is mixed with the molten salt electrolyte either before or after the electrolysis, the products partition to the non-polar solvent. In another embodiment, the separation is facilitated by designing a molten salt electrolyte that has a high freezing point, such that upon cooling the molten salt crystallizes and the products remain a liquid and are separated by a simple method such as filtration.

Some advantages of using a molten salt electrolyte over the conventional, polar organic electrolytes are: 1) the molten electrolyte is electrochemically stable and chemically inert, 2) the molten salt electrolyte has high conductivity, 3) the carboxylate species has a high conductivity in the molten salt electrolyte, 4) the molten salt electrolyte can be designed to permit easy separation of the product and the reactant, 5) the molten salt electrolyte is easily recycled and is an environmentally friendly solvent.

The following examples are given to illustrate various embodiments within the scope of the present invention.

EXAMPLES

Several examples will be given to demonstrate the technical feasibility of using molten salt electrolytes to convert inexpensive carboxylic acids into high value compounds, using the electrochemical decarboxylation process. The examples demonstrate the decarboxylation of sodium salts of carboxylic acids with a variety of functional groups, using electrolytic cells equipped with a NaSelect® NaSICON membrane manufactured by Ceramatec, Inc., Salt Lake City, Utah.

The examples disclosed herein, used an experimental setup which is schematically shown in FIG. 1 or FIG. 2. The cell employed for these experiments minimized the distance between the electrodes and the membrane. The membranes used in the examples consisted of 2.54 cm diameter NaSICON disks of about 1 mm thickness which were housed on scaffolds in the center of the cells. As the scaffold and membrane physically separate the anode and cathode compartments, there was a separate temperature controlled reservoir for the anolyte and catholyte. This allowed the chemistry and conditions of each electrolyte to be optimized for the respective electrode reactions.

The anolyte, which contains the sodium salt of the carboxylic acid, is made by heating different salts together at different ratios. This was conducted by preparing the salts in a separate solution following conventional saponification reactions and then physically mixing the salt together. Or the salts were prepared in a single solution producing a homogenous mixture of the salts. For this method, a general saponification procedure was used during which the sodium carboxylate forms as the carboxylic acid is neutralized. The details of the molten salt preparation will be given as required in the following examples. The catholyte can be made from any solution containing sodium salts, and for the examples given herein an aqueous sodium hydroxide solution was used. To obtain low solution resistance and minimize temperature difference across the membrane the temperatures of the catholyte was increased to 95° C.

Once the reservoirs reached the desired temperatures, a battery tester (Arbin BT2000) was connected and a current density between 10 and 100 $mA/cm^2$ was applied. During the electrolysis the voltage and current were monitored using MITS Pro battery testing software. The applied current density caused oxidation to occur at the anode (platinum mesh electrode) and reduction to occur at the cathode (nickel mesh electrode). As the battery tester transports electrons from the anode to the cathode, a charge balance must be maintained across the cell by the diffusion of positively charge ions. Given the high selectivity of the NaSICON membrane for Na-ions, it is the only species that can provide this balance, thus a high concentration of the sodium salt is desired.

As the temperature of the cell during the experiments of the different molten salt electrolytes is higher than 150° C. some of the products and side products are gases and thus the experiments are conducted in a manner that permits the collection of the gas. The gas from the reaction was passed through an aqueous solution of $Ca(OH)_2$ and then was collected in a gas bag. As the gas is passed through the Ca(OH)$_2$ the CO$_2$ that is produce from the decarboxylation at the anode is converted into CaCO$_3$, and some of the products and side products condense allowing them to be collected and analyzed with GC-MS. The collected gas is also analyzed with GC and GC-MS. Depending on the example, an extraction procedure was used to analyze any products that were still mixed with the molten salt after the salt cooled to room temperature.

Example 1

The molten salt electrolyte disclosed was used in an electrochemical decarboxylation process to convert the sodium salt of a carboxylic acid with a hydroxyl group into an aldehyde. The aldehyde produced can be used as an intermediate to the production of other chemicals. The molten salt electrolyte was comprised solely of the sodium salt of the carboxylic acid desired for the decarboxylation. An aqueous solution containing 10% by weight sodium hydroxide was used as the catholyte (3) and the temperature was maintained between 80 and 100° C.

The molten sodium salt anolyte was prepared by evaporating the water off of an aqueous syrup of sodium lactate (Sigma, 60% DL) using slight vacuum and mild heat. The sodium lactate was then heated to and held at 150° C. for 48 h. The temperature of the sodium lactate was then heated to 160° C. and the cathode compartment (3) was inserted into the melted salt anolyte (7). The aqueous catholyte was heated on a stir plate to 95° C. and then was cycled through the cathode compartment of the cell (3) which was submersed into the anolyte (7). The cell was operated until enough charge passed to theoretically convert 10% of the sodium carboxylate electrolyte. During the electrolysis the temperatures of the anolyte was maintained at 160° C., and a current densities between 5 and 20 mA cm$^{-2}$ were employed.

Figure 3:
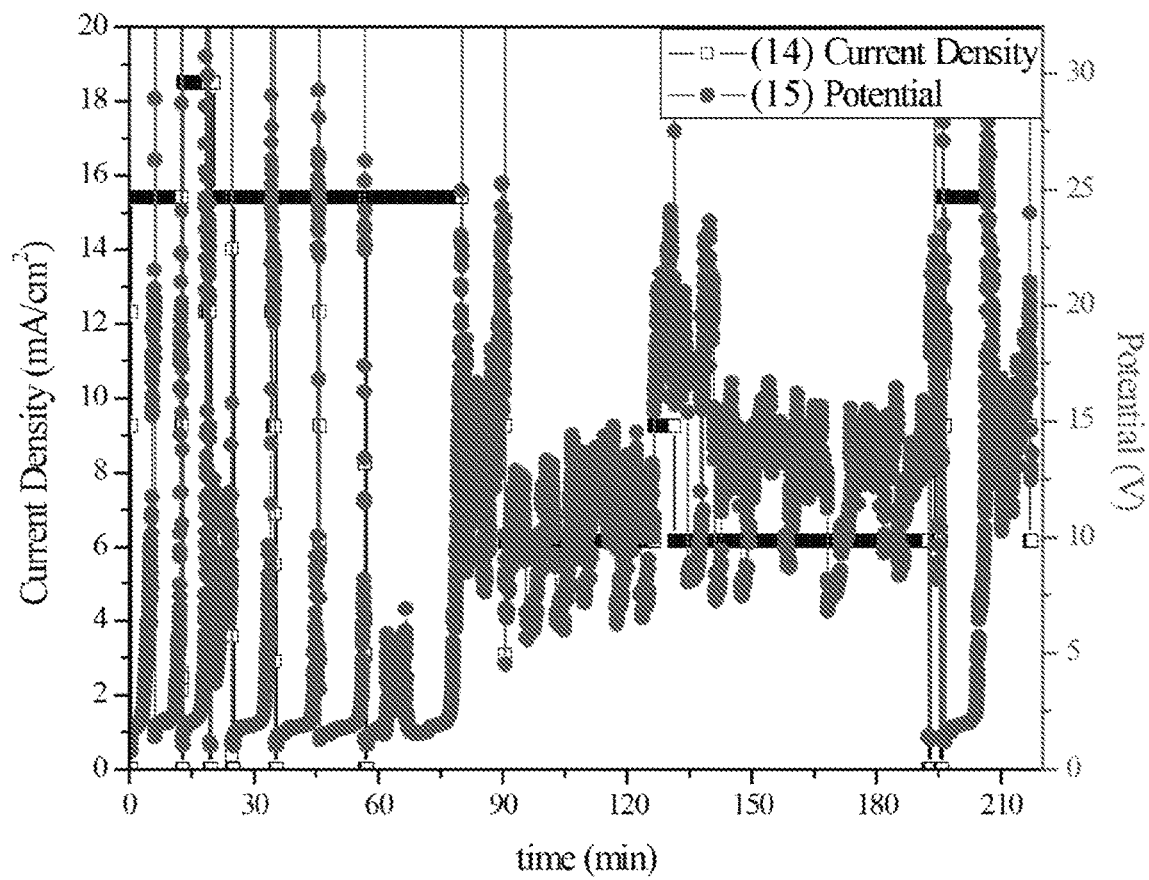
FIG. 3 is a plot of the cell potential and current density of the electrochemical decarboxylation of sodium lactate using a sodium lactate molten salt electrolyte.

FIG. 3 shows the current density (14) and cell potential (15) of the decarboxylation of sodium lactate in a sodium lactate electrolyte. The response shows at a constant current the cell potential (15) varied greatly with time. The large variance in cell potential is from the formation of CO$_2$ bubbles on the electrode and the release of these bubbles. During the electrolysis the reactions that occurred in the anode and cathode compartment are shown below.

$$C(OH)H_2CH_2CO_2Na \rightarrow CH_3C(OH)H^+ + CO_2 + Na^+ + 2e^-$$

$$H_2O + e^- \rightarrow H_2 + OH^-$$

Figure 4:
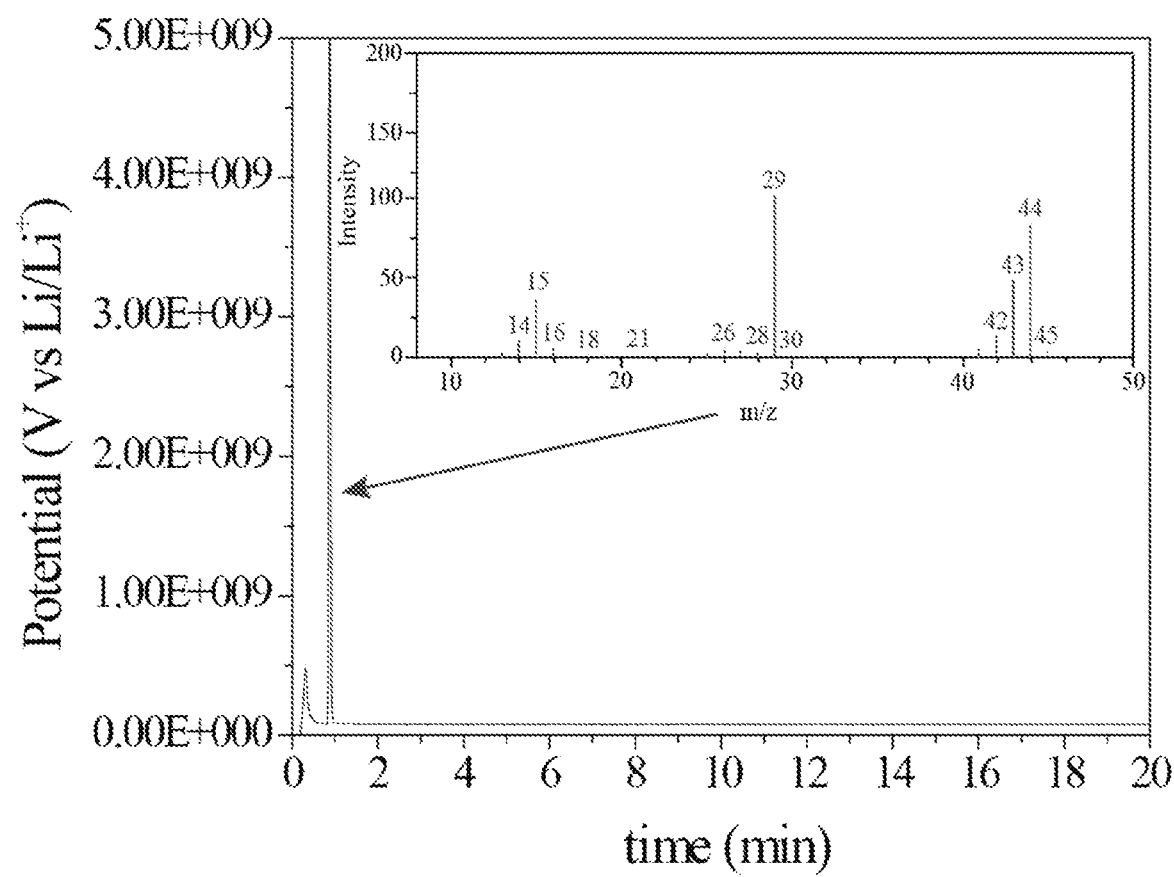
FIG. 4 shows a gas chromatogram of the products obtained from the electrochemical decarboxylation of sodium lactate in sodium lactate molten salt electrolyte with an inset showing the mass spectrum of the main product obtained which matches acetaldehyde.

The decarboxylation occurring in the anode compartment produced CO$_2$ which was bubbled through a calcium hydroxide solution forming calcium carbonate which was then analyzed using TGA. The gas that passed through the calcium hydroxide solution was collected in a gas bag. The GC-MS of the gas in the gas bag is shown in FIG. 4. The first peak shown in FIG. 4 was the elution of N$_2$, O$_2$, and CO$_2$ which was analyzed separately with a packed column and TCl detector. The second peak shown in FIG. 4 was identified as acetaldehyde using the mass spectrum of the peak shown in the inset of the Figure. The conditions used in this example promoted 2e$^-$ oxidation producing acetaldehyde following the reaction shown below.

$$CH_3C(OH)H^+ \rightarrow CH_3CHO + H^+$$

Example 2

The molten salt electrolyte with a different cation but the same anion used in Example 1 can be used in an electrochemical decarboxylation process to perform the decarboxylation of the lactate anion. This example demonstrates how changing the cation of the molten salt electrolyte can lower the melting point of the molten salt and provide a low potential reduction reaction at the anode. The molten salt electrolyte can be comprised solely of the ammonium salt of the carboxylic acid being processed by the decarboxylation process in a single compartment cell.

The molten sodium salt anolyte is prepared by evaporating the water off of an aqueous solution of ammonium lactate (Sigma, 60% DL) using slight vacuum and mild heat. The ammonium lactate is then heated to and maintained at temperature between 50 and 100° C. for the experiment. The cell is operated until enough charge passes to theoretically convert 10% of the sodium carboxylate in the electrolyte. A current density between 5 and 20 mA cm$^{-2}$ is employed during the electrolysis.

At a constant current the cell potential will maintain a constant value between 5 and 20 V. During the electrolysis the reactions that occur at the anode and cathode are shown below.

$$C(OH)H_2CH_2CO_2Na \rightarrow CH_3C(OH)H. + CO_2 + Na^+ + 2e^-$$

$$2NH_4^+ e^- \rightarrow H_2 + NH_3$$

The decarboxylation occurring in the anode compartment will produce CO$_2$ which will be bubbled through a calcium hydroxide solution forming calcium carbonate which will be analyzed using TGA. The gas that passes through the calcium hydroxide solution is collected in a gas bag, and analyzed using GC-MS. The conditions described in this example will permit both 1e$^-$ and 2 e$^-$ oxidation to occur producing acetaldehyde as shown in Example 1 and 2,3 butanediol following the reaction shown below.

$$2CH_3C(OH)H. \rightarrow CH_3CHOHCHOHCH_3$$

Example 3

The molten salt electrolyte disclosed can be used in an electrochemical decarboxylation process to convert the sodium salts of long chain carboxylic acids into long chain saturated hydrocarbons. The saturated hydrocarbons produced can be further processed into either base lubricant or transportation fuel. The molten salt electrolyte can be comprised of a mixture of sodium salts of carboxylic acids which mimic the feed stream of carboxylic acids obtain from biological sources. In this example the cell is run at temperatures above the boiling of aqueous sodium hydroxide, so a solution containing 10% by weight sodium hydroxide in ethyl glycol can be used as the catholyte.

The molten sodium salt anolyte can be prepared by mixing lauric, myristic, palmitic and stearic acid in methanol and then following standard saponification procedure, adding sodium hydroxide to the solution to crash out the sodium salts. Following the addition of the sodium hydroxide the methanol is removed with mild heat under vacuum. The dry sodium salts are then heated to 320° C. and held there for 48 h under nitrogen. The catholyte solution is heated to 150° C. in the cathode compartment of the cell. The cell is operated until enough charge passed to theoretically convert 10% of the sodium carboxylate electrolyte. During the electrolysis the temperature of the anolyte is maintained at 320° C., and a current density of 10 mA cm$^{-2}$ is employed.

The constant current density will produce a constant potential response in between 5 and 20 V. During the electrolysis the reactions that occur at the anode are shown below.

$$RCO_2Na \rightarrow R. + CO_2 + Na^+ + 1e^-$$

In this case, R, is four different saturated hydrocarbons with carbon numbers of $C_{11}$, $C_{13}$, $C_{15}$, and $C_{17}$. The decarboxylation occurring in the anode compartment produced $CO_2$ which is bubbled through a calcium hydroxide solution forming calcium carbonate which is then analyzed using TGA. The gas that passes through the calcium hydroxide solution is collected in a gas bag to be analyzed using GC-MS. Following the electrolysis, the molten salt mixture is cooled to room temperature and dissolved in water. The pH of the solution is adjust to 3 using acid, then liquid/liquid extraction is performed using hexane, and the hexane phase is analyzed with GC-MS. These conditions will promote radical-radical coupling as shown below.

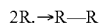

$$2R \cdot \rightarrow R\text{---}R$$

Because more than one carboxylate present in the solution, both homo and hetero coupling will occur leading to the mixture of products.

In one embodiment, an electrochemical cell comprises an electrolyte compartment capable of housing a quantity of electrolyte. The electrolyte comprising a quantity of an alkali metal salt of a carboxylic acid dissolved in a molten salt electrolyte. The alkali metal salt of the carboxylic acid may have at least one functional group in addition to the carboxylic acid moiety. The electrochemical cell includes an anode and a cathode in communication with the electrolyte. It also includes a voltage source, wherein the voltage source decarboxylates the alkali metal salt of the carboxylic acid into alkyl radicals that react to form a coupled radical product.

The electrolyte may be a molten salt electrolyte where the cation of the electrolyte is chosen from lithium, sodium, potassium, magnesium, calcium and mixtures of the same. The electrolyte may also be a molten salt selected from ammonium, imidazolium, pyridinium, pyrrolidinium and phosphonium. The electrolyte may contain a mixture of the cations referenced above. The mixture may contain at up to four different cations. At least one of the cations is chosen to have a low reduction potential. The cation may be chosen such that the reduction of the cation can be easily separated from the electrolyte. The reduction of the cation may produce a chemical of economic value, in addition to the product obtained from the decarboxylation.

The anion of the molten salt electrolyte may be chosen from the groups of halides, sulphonate, amides, tosylates, aluminate, borates, sulfates, nitrates, and carboxylates, or mixtures thereof. The mixture of anions may include up to four different anions. One of the anions may be chosen to have high oxidation potential. The oxidation potential is higher than that of the carboxylate anion being processed by the cell. One of the anions chosen may be a carboxylate anion similar to the carboxylate being processed with the cell. In one embodiment, one of the anions is chosen such that it is the carboxylate being processed with the cell.

In one embodiment, a salt of a carboxylic acid is dissolved into the molten salt electrolyte. The carboxylate is chosen from acetate, propionate, lactate, butyrate, pentanoate, hexanoate, heptanoate, octanoate, laurate, oleate, stearate, linoleate, palmitate, myristrate, levulinate, valerate, benzoate, naphthenate and naphthoate or combinations thereof. The products of the decarboxylation may be easily separated from the electrolyte.

In one embodiment, the electrolyte comprises of a mixture of cations and anions. The composition of the electrolyte may be such that a eutectic mixture is formed with a lower melting point than the melting point of the individual components of the mixture. The electrolyte may contain as low as 2% of any particular component of a mixture and up to 98% of any particular component of the mixture.

The electrochemical cell may be operated at a temperature above the melting point of the molten salt electrolyte, but below the melting point of the products of the reduction and oxidation reactions. The cell may be operated at a temperature above the melting point of the molten salt electrolyte and either of or both of the products of the reduction and oxidation reactions. In one embodiment, the electrochemical cell is operated at a temperature above the melting point of the molten salt and above the boiling point of the products of either or both the reduction and oxidation reactions. The temperature of the cell may be optimized in order to promote the decarboxylation via lowering the activation energy of the decarboxylation and increasing the rate of $CO_2$ evolution.

In another embodiment, an electrochemical cell comprises an anolyte compartment capable of housing a quantity of anolyte. The anolyte may comprise a quantity of an alkali metal salt of a carboxylic acid dissolved in a molten salt electrolyte, wherein the alkali metal salt of the carboxylic acid has at least one functional group in addition to the carboxylic acid moiety. The electrochemical cell may include an anode in communication with the anolyte, a catholyte compartment capable of housing a quantity of catholyte. A cathode is in communication with the catholyte. A membrane may separate the anolyte and catholyte. In one embodiment, a voltage source decarboxylates the alkali metal salt of the carboxylic acid into alkyl radicals that react to form a coupled radical products. Like in other embodiments, the analyte may be comprised of a molten salt electrolyte and may have similar cations and anions, alone or in respective mixtures.

In one embodiment, the electrolyte may contain as low as 2% of any particular component of a mixture and up to 98% of any particular component of the mixture. The composition of the catholyte may be the same or different than the anolyte. The catholyte may be comprised of a dissolved salt in a polar solvent wherein the cation of the dissolved salt is chosen from those cations referenced herein throughout and mixtures thereof. The anion of the dissolved salt may also be chosen from those anions referenced herein throughout and mixtures thereof.

In one embodiment, the catholyte is comprised of a molten metal. The molten metal may include lithium, sodium, potassium, magnesium and calcium and mixtures thereof. The catholyte may be maintained at the same or different temperature as the anolyte. As discussed previously, the cell may be operated at a temperature above the melting point of the molten salt anolyte, but below the melting point of the products of the oxidation reaction. In some embodiments, the cell may be operated at a temperature above the melting point of the molten salt anolyte and of the products of the oxidation reaction. In still other embodiments, the cell may be operated at a temperature above the melting point of the molten salt anolyte and above the boiling point of the products of the oxidation reaction. The temperature of the cell may be optimized in order to promote the decarboxylation via lowering the activation energy of the decarboxylation and increasing the rate of $CO_2$ evolution.

The membrane separating the anolyte and catholyte compartments may be a cation exchange membrane. The membrane may be a NaSICON (sodium super ion conducting) membrane or other ion selective membrane such as LiSICON (lithium super ion conducting). In one embodiment, the membrane comprises a thickness of between about 10 and about 5000 microns. In another embodiment, the membrane comprises a thickness of between about 100 and about 1000 microns. In yet another embodiment, the membrane comprises a thickness of between about 200 and about 700 microns. The membrane may include either a planar configuration or a cylindrical configuration.

The catholyte compartment may include an outlet that is used to collect hydrogen gas, and the anolyte compartment may include an outlet that is used to collect the coupled radical product.

In one embodiment, an electrochemical cell comprises an anolyte comprising a quantity of a salt of a carboxylic acid, wherein the salt of the carboxylic acid has at least one functional group in addition to the carboxylic acid moiety. The cell includes an anode in communication with the anolyte and a catholyte in communication with the catholyte. A voltage source decarboxylates the metal salt of the carboxylic acid into alkyl radicals that react to form a coupled radical product, wherein the coupled radical product has at least two functional groups.

In another embodiment, an electrochemical cell comprises an anolyte comprising a quantity of salts of carboxylic acids, wherein at least one salt is an aryl carboxylic acid and at least another salt is an alkyl carboxylic acid. The cell includes an anode in communication with the anolyte and a cathode in communication with the catholyte. A voltage source decarboxylates the salt of the carboxylic acid into radicals that react to form homo- and hetero-coupled products, wherein the heterocoupled product has at least one alkyl and one aryl group.

In another embodiment, an electrochemical cell comprises an anolyte comprising a quantity of salts of carboxylic acids, wherein the salts are saturated or mostly saturated carboxylic acids. The cell includes an anode in communication with the anolyte and a cathode in communication with the catholyte. A voltage source decarboxylates the salts of the carboxylic acids into radicals that react to form homo- and hetero-coupled products, wherein the products are saturated or mostly saturated hydrocarbons.

A method for producing a coupled radical product having at least two functional groups is also disclosed herein. The method includes obtaining a salt of a carboxylic acid that has at least one functional group in addition to the carboxylic acid moiety, wherein the functional group consists of halide groups, sulfide groups, hydroxyl groups, amine groups, amide groups, and ether groups. The method includes the step of decarboxylating the salt of the carboxylic acid into alkyl radicals that react to form a coupled radical product, wherein the coupled radical product has at least two of the functional groups. In the method, the carboxylic acid may be derived from biomass. The salt of the carboxylic acid may be formed via a saponification reaction using a base of the formula BOH or BOR, wherein, "B" represents a base and "OH" represents a hydroxide anion and "OR" represents an alkoxide anion. The base may be re-formed as part of the decarboxylation and the base may be collected and re-used in a further saponification reaction.

In one embodiment, a method for producing a coupled radical product having both aryl and alkyl components includes the steps of obtaining a salt of an aryl carboxylic acid, and a salt of an alkyl carboxylic acid. The method includes decarboxylating the salts of the carboxylic acid into radicals that react to form homo- and hetero-coupled product, wherein the heterocoupling product has at least one alkyl and one aryl group. One of the carboxylic acids is derived from naphthenic acid. The salts of the carboxylic acid are formed via a saponification reaction using a base of the formula BOH or BOR, wherein, "B" represents a base and "OH" represents a hydroxide anion and "OR" represents an alkoxide anion. The base is re-formed as part of the decarboxylation.

In one embodiment, a method for producing a coupled radical product which is a saturated or mostly saturated hydrocarbon includes the steps of obtaining a salt or salts of saturated carboxylic acids, decarboxylating the salt or salts of the carboxylic acids into radicals that react to form homo- and hetero-coupled products, wherein the products are saturated or mostly saturated hydrocarbons. The salt of the carboxylic acid may be derived from biomass. The salts of the carboxylic acids may be formed via a saponification reaction using a base of the formula BOH or BOR, wherein, "B" represents a base and "OH" represents a hydroxide anion and "OR" represents an alkoxide anion. The base may be re-formed as part of the decarboxylation, wherein the base is collected and re-used in a further saponification reaction.

The present invention may be embodied in other specific forms without departing from its structures, methods, or other essential characteristics as broadly described herein and claimed hereinafter. The described embodiments are to be considered I all respects only as illustrative, and not restrictive. The scope of the invention is, therefore, indicated by the appended claims, rather than by the foregoing description. All changes that come within the meaning and range of the equivalency of the claims are to be embraced within their scope.

The invention claimed is:

1. A method for producing a coupled radical product, comprising:
   providing a molten salt electrolyte comprising a mixture of inorganic salts, wherein the mixture comprises different inorganic cations and at least one carboxylate anion to provide inorganic carboxylate salts; and
   applying a voltage to the molten salt electrolyte thereby decarboxylating the inorganic carboxylate salts into radicals that react to form at least one radical coupling product;
   wherein the molten salt electrolyte further comprises a different anion from the at least one carboxylate anion; or
   wherein the molten salt electrolyte comprises a mixture of inorganic salts, wherein the mixture comprises different carboxylate anions.

2. The method of claim 1, wherein the molten salt electrolyte is a eutectic mixture with a lower melting point than the melting point of the individual components of the electrolyte mixture.

3. The method of claim 1, wherein the molten salt electrolyte further comprises a different anion from the at least one carboxylate anion.

4. The method of claim 3, wherein the different anion selected from the group consisting of halides, sulphonates, amides, tosylates, aluminates, borates, sulfates, nitrates, and a carboxylate other than the at least one carboxylate anion.

5. The method of claim 1, wherein the at least one carboxylate anion is selected from the group consisting of acetate, propionate, lactate, butyrate, pentanoate, hexanoate, heptanoate, octanoate, laurate, oleate, stearate, linoleate, palmitate, myristrate, levulinate, valerate, benzoate, naphthenate and naphthoate.

6. The method of claim 1, wherein the different inorganic cations of the molten salt electrolyte are selected from the group consisting of an alkali metal, an alkaline earth metal, and mixtures of the same.

7. The method of claim 6, wherein the inorganic cation of the molten salt electrolyte is selected from the group consisting of ammonium, lithium, sodium, potassium, magnesium, calcium, and mixtures of the same.

8. The method of claim 6, wherein the electrolyte contains a mixture of sodium salts.

9. The method of claim 6, wherein the molten salt electrolyte contains a mixture of at least three inorganic cations.

10. The method of claim 1, wherein the molten salt electrolyte comprises a mixture of inorganic salts, wherein the mixture comprises different carboxylate anions.

11. An electrochemical cell comprising:
an electrolyte compartment with a quantity of electrolyte, wherein the electrolyte is a molten salt electrolyte comprising a mixture of inorganic salts, wherein the mixture comprises different inorganic cations and at least one carboxylate anion to provide inorganic carboxylate salts;
an anode in communication with the electrolyte;
a cathode in communication with the electrolyte; and
a voltage source that decarboxylates the inorganic carboxylate salts into radicals that react to form at least one radical coupling product;
wherein the molten salt electrolyte further comprises a different anion from the at least one carboxylate anion; or
wherein the molten salt electrolyte comprises a mixture of inorganic salts, wherein the mixture comprises different carboxylate anions.

12. The cell of claim 11 wherein the molten salt electrolyte further comprises a different anion from the at least one carboxylate anion.

13. The cell of claim 12, wherein the different anion selected from the group consisting of halides, sulphonates, amides, tosylates, aluminates, borates, sulfates, nitrates, and a carboxylate other than the at least one carboxylate anion.

14. The cell of claim 12, wherein the oxidation potential of the different anion in the molten salt electrolyte is higher than the oxidation potential of the at least one carboxylate anion.

15. The cell of claim 12, wherein the molten salt electrolyte comprises a mixture of inorganic salts, wherein the mixture comprises different carboxylate anions.

16. The cell of claim 11, wherein the at least one carboxylate anion is selected from the group consisting of acetate, propionate, lactate, butyrate, pentanoate, hexanoate, heptanoate, octanoate, laurate, oleate, stearate, linoleate, palmitate, myristrate, levulinate, valerate, benzoate, naphthenate and naphthoate.

17. The cell of claim 11, wherein the different inorganic cations of the molten salt electrolyte are selected from the group consisting of an alkali metal, an alkaline earth metal, and mixtures of the same.

18. The cell of claim 17, wherein the different inorganic cations of the molten salt electrolyte are selected from the group consisting of ammonium, lithium, sodium, potassium, magnesium, calcium, and mixtures of the same.

19. The cell of claim 17, wherein the electrolyte contains a mixture of sodium salts.

20. The cell of claim 17, wherein the molten salt electrolyte contains a mixture of at least three inorganic cations.

21. The cell of claim 17, wherein the electrolyte is a eutectic mixture with a lower melting point than the melting point of the individual components of the electrolyte mixture.

22. The cell of claim 17, wherein the cell is operated at a temperature above the melting point of the molten salt electrolyte, but below the melting point of the products.

* * * * *